US012756511B2

(12) United States Patent
Nimbalker et al.

(10) Patent No.: US 12,756,511 B2
(45) Date of Patent: Oct. 6, 2026

(54) INDICATION OF TRACKING REFERENCE SIGNAL PRESENCE

(71) Applicant: Telefonaktiebolaget LM Ericsson (publ), Stockholm (SE)

(72) Inventors: Ajit Nimbalker, Dublin, CA (US); Ravikiran Nory, San José, CA (US); Sina Maleki, Malmö (SE); Andres Reial, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 317 days.

(21) Appl. No.: 18/272,444

(22) PCT Filed: Jan. 14, 2022

(86) PCT No.: PCT/EP2022/050805
§ 371 (c)(1),
(2) Date: Jul. 14, 2023

(87) PCT Pub. No.: WO2022/152888
PCT Pub. Date: Jul. 21, 2022

(65) Prior Publication Data
US 2024/0313911 A1 Sep. 19, 2024

Related U.S. Application Data

(60) Provisional application No. 63/138,317, filed on Jan. 15, 2021.

(51) Int. Cl.
*H04L 5/00* (2006.01)
*H04W 72/232* (2023.01)

(52) U.S. Cl.
CPC ......... *H04L 5/0048* (2013.01); *H04W 72/232* (2023.01)

(58) Field of Classification Search
CPC ..................................................... H04L 5/0048
See application file for complete search history.

(56) References Cited

U.S. PATENT DOCUMENTS

2018/0205526 A1* 7/2018 Kim ...................... H04L 1/0026
2019/0215117 A1* 7/2019 Lee ....................... H04L 5/0094
(Continued)

FOREIGN PATENT DOCUMENTS

EP 4228351 A1 8/2023
WO 2022074748 A1 4/2022

OTHER PUBLICATIONS

International Search Report and Written Opinion of the International Searching Authority, PCT/EP2022/050805, mailed Jun. 1, 2022, 11 pages.
(Continued)

*Primary Examiner* — Andrew Lee
(74) *Attorney, Agent, or Firm* — Sage Patent Group

(57) ABSTRACT

A communication device in a communications network can receive an indication from a network node in the communication network indicating one of the following: that a reference signal will be present at a reference signal occasion, that a reference signal may or may not be present at a reference signal occasion, or that the reference signal will be absent at the reference signal occasion. The communication device can decode a paging message at a paging occasion following the reference signal occasion.

16 Claims, 11 Drawing Sheets

(56) References Cited

U.S. PATENT DOCUMENTS

| | | | | |
|---|---|---|---|---|
| 2022/0046581 | A1* | 2/2022 | He | H04L 5/0048 |
| 2022/0131669 | A1* | 4/2022 | Takeda | H04L 5/0048 |
| 2022/0303089 | A1* | 9/2022 | Liao | H04L 5/0091 |
| 2022/0322231 | A1* | 10/2022 | Sun | H04W 52/0229 |
| 2023/0064231 | A1* | 3/2023 | Haghighat | H04W 72/51 |
| 2023/0109874 | A1* | 4/2023 | Gan | H04L 27/2602 370/329 |
| 2023/0189211 | A1* | 6/2023 | Lauridsen | H04L 5/005 455/458 |
| 2023/0354098 | A1* | 11/2023 | Ko | H04W 74/006 |
| 2023/0422165 | A1* | 12/2023 | Sun | H04L 5/0051 |
| 2024/0080169 | A1* | 3/2024 | He | H04L 5/0048 |

OTHER PUBLICATIONS

Vivo, "TRS/CSI-RS occasion(s) for idle/inactive UEs," 3GPP TSG RAN WG1 #103-e, R1-2007674, e-Meeting, Oct. 26-Nov. 13, 2020, 9 pages.

Ericsson, Provisioning of potential TRS/CSI-RS occasion(s) for idle/inactive UEs, 3GPP TSG RAN WG1 #103-e, R1-2009201, e-Meeting, Oct. 26-Nov. 13, 2020, 12 pages.

3GPP TS 38.212 v16.2.0 (Jun. 2020); 3rd Generation Partnership Project; Technical Specification Group Radio Access Network; NR; Multiplexing and channel coding (Release 16), 151 pages.

3GPP TS 38.214 v16.2.0 (Jun. 2020); 3rd Generation Partnership Project; Technical Specification Group Radio Access Network; NR; Physical layer procedures for data (Release 16), 163 pages.

3GPP TS 38.331 v16.3.0 (Dec. 2020); 3rd Generation Partnership Project; Technical Specification Group Radio Access Network; NR; Radio Resource Control (RRC) protocol specification (Release 16), 932 pages.

Japanese Office Action mailed Aug. 27, 2024 for Japanese Patent Application No. 2023-542861, 17 pages (including English translation).

Lenovo et al., "Provision of TRS/CSI-RS for idle/inactive UEs," 3GPP TSG RAN WG1 Meeting #103-e, R1-2009106, e-Meeting, Oct. 26-Nov. 13, 2020, 6 pages.

Intel Corporation, "Downlink control enhancements for eURLLC," 3GPP TSG RAN WG1 #98, R1-1908645, Prague, CZ, Aug. 26-30, 2019, 15 pages.

Mediatek Inc., "On TRS/CSI-RS occasions(s) for idle/inactive mode UE power saving," e3GPP TSG RAN WG1 Meeting #103-e, R1-2008965, e-Meeting, Oct. 26-Nov. 13, 2020, 8 pages.

* cited by examiner

| Bitfield (TIF) | Indication |
|---|---|
| 00 | TRS is present in TRS occasion(s) in next Y1 ms |
| 01 | TRS is not present in TRS occasion(s) in next Y1 ms |
| 10 | TRS may or may not be present in TRS occasion(s) in next Y1 ms |
| 11 | Reserved |

| Bitfield (TIF) | Indication |
|---|---|
| 0 | TRS is present in TRS occasion(s) in next Y1 ms |
| 1 | Reserved |

| TB Scaling Field | Scaling Factor S |
|---|---|
| 00 | 1 |
| 01 | 0.5 |
| 10 | 0.25 |
| 11 | |

FIG. 8

| Bitfield (TIF) | Indication |
|---|---|
| 000 | TRS is present in TRS occasion(s) of the first group in next Y1 ms |
| 001 | TRS is not present in TRS occasion(s) of the first group in next Y1 ms |
| 010 | TRS may or may not be present in TRS occasion(s) of the first group in next Y1 ms |
| 011 | Reserved |
| 100 | TRS is present in TRS occasion(s) of the second group in next Y2 ms |
| 101 | TRS is not present in TRS occasion(s) of the second group in next Y2 ms |
| 110 | TRS may or may not be present in TRS occasion(s) of the second group in next Y2 ms |
| 111 | Reserved |

FIG. 9

INDICATION OF TRACKING REFERENCE SIGNAL PRESENCE

CROSS REFERENCE TO RELATED APPLICATIONS

This application is a 35 U.S.C. § 371 national stage application of PCT International Application No. PCT/EP2022/050805 filed on Jan. 14, 2022, which in turn claims domestic priority to U.S. Provisional Patent Application No. 63/138,317, filed on Jan. 15, 2021, the disclosures and content of which are incorporated by reference herein in their entirety.

TECHNICAL FIELD

The present disclosure relates generally to communications, and more particularly to communication methods and related devices and nodes for indicating the presence of a tracking reference signal.

BACKGROUND

FIG. 1 illustrates an example of a 5th Generation ("5G") network (also referred to as a new radio ("NR") network) including a pair of network nodes 110*a-b* (e.g., 5G base stations ("gNB")) and multiple communication devices 120 (also referred to as user equipment ("UE")).

A user equipment ("UE") (also referred to as a communication device) in idle mode can receive information about paging configuration via higher layer signaling (e.g., system information signaling). For each discontinuous reception cycle in idle mode ("I-DRX cycle"), a UE can start processing (e.g., wake up operations) in advance of its paging occasion (e.g., to receive one or more synchronization signals blocks ("SSBs") for functions such as automatic gain control ("AGC") and time-frequency synchronization). In the paging occasion, a UE can attempt to decode a paging downlink control information ("DCI") (e.g., a DCI 1-0 with cyclic redundancy check ("CRC") scrambled by a paging radio network temporary identifier ("P-RNTI")), and if a paging DCI is detected, the UE can also decode a paging physical downlink shared channel ("PDSCH") assigned by the paging DCI to identify if it has been paged (e.g. if the paging message contains UE's $5^{th}$ generation serving temporary mobile subscriber identity ("5G-S-TMSI")). The paging DCI can include the modulation and coding scheme ("MCS"), resource allocation, transport block ("TB") scaling field, and redundancy version associated with the scheduled PDSCH. The paging DCI can also be used to indicate system information ("SI") change, in which case UE may not need to decode the corresponding PDSCH.

SUMMARY

According to some embodiments, a method of operating a communication device in a communications network is provided. The method can include receiving an indication from a network node in the communication network indicating one of the following: that a reference signal will be present at a reference signal occasion, that a reference signal may or may not be present at a reference signal occasion, or that the reference signal will be absent at the reference signal occasion. The method can further include decoding a paging message at a paging occasion following the reference signal occasion.

According to other embodiments, a method of operating a network node in a communications network is provided. The method can include determining whether to transmit a reference signal at a reference signal occasion. The method can further include transmitting an indication to a communication device in the communication network. The indication indicating one of the following: that a reference signal will be present at a reference signal occasion, that a reference signal may or may not be present at a reference signal occasion, or that the reference signal will be absent at the reference signal occasion.

According to other embodiments, a communication device, network node, computer program, and a computer program product can be provided for performing the above methods.

Various embodiments described herein provide a potential advantage of allowing a NW to flexibly indicate via L1 signaling whether TRS is present, not present, and/or may be present. This signaling can enable a flexible UE implementation that can skip TRS detection or take advantage of TRS blind detection and save UE power.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 8 is a table illustrating an example of a transport block ("TB") scaling field in a paging DCI according to some embodiments of inventive concepts;

FIG. 9 is a table illustrating another example of a TIF field within a DCI according to some embodiments of inventive concepts;

DETAILED DESCRIPTION

Figures 1, 2, 3:
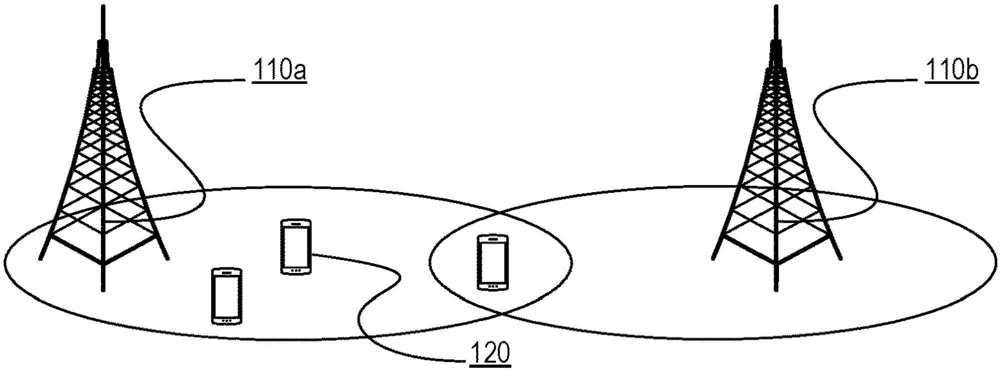
FIG. 1 is a schematic diagram illustrating an example of a wireless communications network.
FIG. 2 is a table illustrating an example of a tracking reference signal presence/absence indicator field ("TIF") field within a downlink control information ("DCI") according to some embodiments of inventive concepts.
FIG. 3 is a table illustrating another example of a TIF field within a DCI according to some embodiments of inventive concepts.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As described above, a UE in idle mode can receive information about paging configuration via higher layer signaling.

If additional reference signals such as a tracking reference signal ("TRS") are provided to an idle/inactive UE, the UE can reduce its wakeup time and still receive enough signals (e.g., SSBs and TRS) in advance of its paging occasion and decode paging PDSCH, and thereby reduce UE power consumption. However, sending additional TRS to an idle/inactive UE increases network power consumption. Thus, only when a TRS is being used for a connected mode UE, allowing an idle UE to take advantage of such TRS can provide opportunistic UE power saving without increasing network ("NW") power consumption.

A network ("NW") can indicate the configured potential TRS/channel state information reference signal ("CSI-RS") occasions via system information signaling to idle/inactive UEs. Whether a tracking reference signal ("TRS")/CSI-RS is transmitted or not in a potential TRS/CSI-RS occasion is left up to NW implementation.

In some examples, a process can allow explicit/implicit indication of availability of TRS/CSI-RS in a TRS/CSI-RS occasion are also being considered such as informing in a system information block ("SIB") that TRS is always present in a TRS/CSI-RS occasion; using layer 1 ("L1") signaling such a paging downlink control information ("DCI") to indicate that TRS/CSI-RS is available in a TRS/CSI-RS occasion; leaving it up to UE implementation to blindly detect whether TRS/CSI-RS is available in a TRS/CSI-RS occasion; or that TRS/CSI-RS is always present in a TRS/CSI-RS occasion if there is a corresponding paging message (paging physical downlink shared channel ("PDSCH")) in an upcoming paging occasion ("PO").

The DCI format used for scheduling paging physical downlink control channel ("PDCCH") in a PO is described below.

The following information is transmitted by means of the DCI format 1_0 with cyclic redundancy check ("CRC") scrambled by paging radio network temporary identifier ("P-RNTI"):

- Short Messages Indicator—2 bits.
- Short Messages—8 bits. If only the scheduling information for Paging is carried, this bit field is reserved.
- Frequency domain resource assignment—

$$\lceil \log_2(N_{RB}^{DL,BWP}(N_{RB}^{DL,BWP}+1)/2) \rceil$$

bits. If only the short message is carried, this bit field is reserved.

$$N_{RB}^{DL,BWP}$$

is the size of control resource set ("CORESET") 0
- Time domain resource assignment—4 bits. If only the short message is carried, this bit field is reserved.
- Virtual resource block ("VRB")-to-physical resource block ("PRB") mapping—1 bit. If only the short message is carried, this bit field is reserved.
- Modulation and coding scheme—5 bits. If only the short message is carried, this bit field is reserved.
- TB scaling—2 bits. If only the short message is carried, this bit field is reserved.
- Reserved bits—8 bits for operation in a cell with shared spectrum channel access; otherwise 6 bits Reserved bits in DCI can be used for incorporating new functionality such as L1-based availability of TRS/CSI-RS in a TRS/CSI-RS occasion without any backward compatibility issues.

Some potential problems with the current examples above is that they do not provide good balance between NW power consumption (e.g., having to transmit extra TRS/CSI-RS solely to help idle/inactive UEs) and UE power consumption (e.g., having to blindly detect whether TRS/CSI-RS is present in a TRS/CSI-RS occasion).

There is a need for a signaling method that allows a gNB to flexibly turn off/on the TRS/CSI-RS transmissions in a TRS/CSI-RS occasion, while simultaneously informing the UE accordingly so that UE implementations can flexibly choose to blind detect or not whether a TRS/CSI-RS is present or not in a TRS/CSI-RS occasion.

Various embodiments herein define a code point in L1 signaling (e.g., via DCI), in which having a first field set to a first value indicates presence of TRS/CSI-RS in one or more occasions. In additional or alternative embodiments, having the first field set to a second value indicates that TRS/CSI-RS may or may not be present in one or more occasions. In additional or alternative embodiments, having the first field set a third value indicates that TRS/CSI-RS is not present in one or more occasions.

In additional or alternative embodiments, a flexible way of indicating the location of the bitfield that indicates TRS/CSI-RS availability indication within the DCI is provided.

In additional or alternative embodiments, a NW is allowed to send/omit transmission of TRS/CSI-RS in TRS/CSI-RS occasions for an idle/inactive mode UE without compromising NW energy consumption while also providing the flexibility at the UE side to choose whether to use blind detection of TRS/CSI-RS or simply look for precise presence/absence signaling of TRS/CSI-RS. In additional or alternative embodiments, some aspects of the invention allow the NW to transmit the same DCI to all the UEs irrespective of their release, and thus the UEs in new releases (e.g., Rel 17 which exploits TRS in idle mode) can receive the same DCI as previous releases, reducing additional PDCCH transmission(s) at the NW side.

Figure 10:
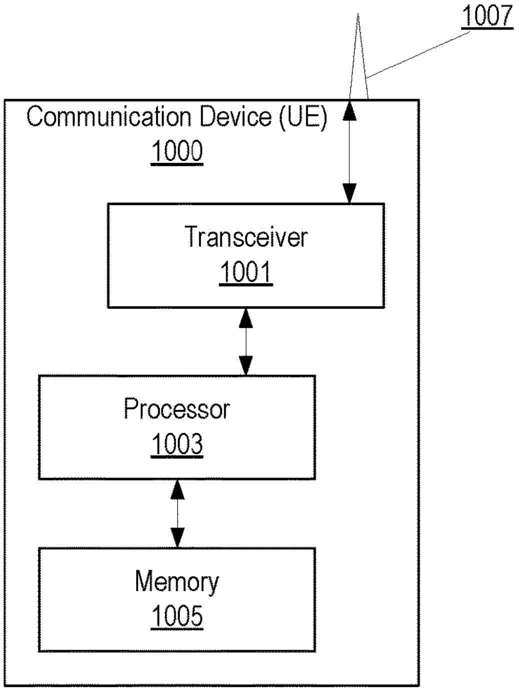
FIG. 10 is a block diagram illustrating a wireless device ("UE") according to some embodiments of inventive concepts.

FIG. 10 is a block diagram illustrating elements of a wireless device 1000 (also referred to as a mobile terminal, a mobile communication terminal, a wireless communication device, a wireless terminal, mobile device, a wireless communication terminal, a user equipment ("UE"), a user equipment node/terminal/device, etc.) configured to provide wireless communication according to embodiments of inventive concepts. (Wireless device 1000 may be provided, for example, as discussed below with respect to wireless device 4110 of FIG. 15, UE 4200 of FIG. 16, and UEs 4491, 4492 of FIG. 18.) As shown, wireless device UE may include an antenna 1007 (e.g., corresponding to antenna 4111 of FIG. 15), and transceiver circuitry 1001 (also referred to as a transceiver, e.g., corresponding to interface 4114 of FIG. 15; interfaces 4205, 4209, 4211, transmitter 4233 and receiver 4235 of FIG. 16) including a transmitter and a receiver configured to provide uplink and downlink radio communications with a base station(s) (e.g., corresponding to network node 4160 of FIG. 15, also referred to as a RAN node) of a radio access network. Wireless device UE may also include processing circuitry 1003 (also referred to as a processor, e.g., corresponding to processing circuitry 4120 of FIG. 15 and processor 4201 of FIG. 16) coupled to the transceiver circuitry, and memory circuitry 1005 (also referred to as memory, e.g., corresponding to device readable medium 4130 of FIG. 15) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that separate memory circuitry is not required. Wireless device UE may also include an interface (such as a user interface) coupled with processing circuitry 1003, and/or wireless device UE may be incorporated in a vehicle.

As discussed herein, operations of wireless device UE may be performed by processing circuitry 1003 and/or transceiver circuitry 1001. For example, processing circuitry 1003 may control transceiver circuitry 1001 to transmit communications through transceiver circuitry 1001 over a radio interface to a radio access network node (also referred to as a base station) and/or to receive communications through transceiver circuitry 1001 from a RAN node over a radio interface. Moreover, modules may be stored in memory circuitry 1005, and these modules may provide instructions so that when instructions of a module are executed by processing circuitry 1003, processing circuitry 1003 performs respective operations (e.g., operations discussed below with respect to Example Embodiments relating to wireless devices).

Figure 11:
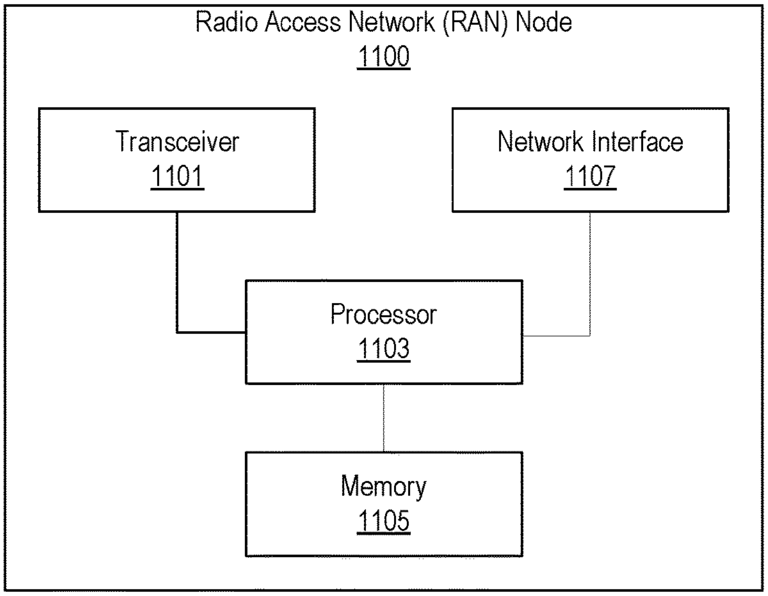
FIG. 11 is a block diagram illustrating a radio access network ("RAN") node according to some embodiments of inventive concepts.

FIG. 11 is a block diagram illustrating elements of a radio access network RAN node 1100 (also referred to as a network node, base station, eNodeB/eNB, gNodeB/gNB, etc.) of a Radio Access Network ("RAN") configured to provide cellular communication according to embodiments of inventive concepts. (RAN node 1100 may be provided, for example, as discussed below with respect to network node 4160 of FIG. 15, and base stations 4412*a-c* of FIG. 18, all of which should be considered interchangeable in the examples and embodiments described herein and be within the intended scope of this disclosure, unless otherwise noted) As shown, the RAN node may include transceiver circuitry 1101 (also referred to as a transceiver, e.g., corresponding to portions of interface 4190 of FIG. 15) including a transmitter and a receiver configured to provide uplink and downlink radio communications with mobile terminals. The RAN node may include network interface circuitry 1107 (also referred to as a network interface, e.g., corresponding to portions of interface 4190 of FIG. 15) configured to provide communications with other nodes (e.g., with other base stations) of the RAN and/or core network CN. The network node may also include processing circuitry 1103 (also referred to as a processor, e.g., corresponding to processing circuitry 4170 of FIG. 15) coupled to the transceiver circuitry, and memory circuitry 1105 (also referred to as memory, e.g., corresponding to device readable medium 4180 of FIG. 15) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that a separate memory circuitry is not required.

As discussed herein, operations of the RAN node may be performed by processing circuitry 1103, network interface 1107, and/or transceiver 1101. For example, processing circuitry 1103 may control transceiver 1101 to transmit downlink communications through transceiver 1101 over a radio interface to one or more mobile terminals or mobile UEs and/or to receive uplink communications through transceiver 1101 from one or more mobile terminals or mobile UEs over a radio interface. Similarly, processing circuitry 1103 may control network interface 1107 to transmit communications through network interface 1107 to one or more other network nodes and/or to receive communications through network interface from one or more other network nodes. Moreover, modules may be stored in memory 1105, and these modules may provide instructions so that when instructions of a module are executed by processing circuitry 1103, processing circuitry 1103 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 12:
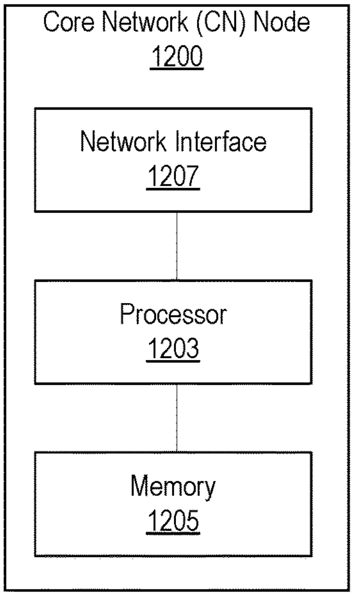
FIG. 12 is a block diagram illustrating a CN ("CN") node according to some embodiments of inventive concepts.

FIG. 12 is a block diagram illustrating elements of a core network CN node (e.g., an SMF node, an AMF node, etc.) of a communication network configured to provide cellular communication according to embodiments of inventive concepts. As shown, the CN node may include network interface circuitry 1207 (also referred to as a network interface) configured to provide communications with other nodes of the core network and/or the radio access network RAN. The CN node may also include a processing circuitry 1203 (also referred to as a processor) coupled to the network interface circuitry, and memory circuitry 1205 (also referred to as memory) coupled to the processing circuitry. The memory circuitry 1205 may include computer readable program code that when executed by the processing circuitry 1203 causes the processing circuitry to perform operations according to embodiments disclosed herein. According to other embodiments, processing circuitry 1203 may be defined to include memory so that a separate memory circuitry is not required.

As discussed herein, operations of the CN node may be performed by processing circuitry 1203 and/or network interface circuitry 1207. For example, processing circuitry 1203 may control network interface circuitry 1207 to transmit communications through network interface circuitry 1207 to one or more other network nodes and/or to receive communications through network interface circuitry from one or more other network nodes. Moreover, modules may be stored in memory 1205, and these modules may provide instructions so that when instructions of a module are executed by processing circuitry 1203, processing circuitry 1203 performs respective operations (e.g., operations discussed below with respect to Example Embodiments relating to core network nodes).

In some embodiments described herein, the term idle refers both to RRC_IDLE and RRC_INACTIVE states of the UE. Furthermore, while some embodiments described herein discuss using a CSI-RS for tracking (TRS), similar operations can be applied to any other CSI-RSs whose configuration information is provided to idle UEs.

In some embodiments, an idle mode UE camps on a NR cell. The UE can receive broadcast or dedicated system information or release message (or the higher layer signaling) that includes paging configuration information. The UE can also receive configuration information related to TRS occasions (or potential TRS occasions). A gNB may or may not transmit a TRS in a TRS occasion. If the UE determines that a TRS is present in a TRS occasion, it can process that signal to perform functions such as AGC and time/frequency tracking, and use the signal in processing a paging occasion to detect a paging message.

In additional or alternative embodiments, a UE can receive via higher layer signaling at least one parameter indicating the location of a TRS presence/absence indicator field ("TIF") within a downlink control information (DCI) format. In some examples, if the DCI size is 60 bits, an explicit value between 0 and 59 can be used to indicate the location of the TIF. In other examples, if the value is set to 10, then bit number 10 within the DCI format is used for TIF. If TIF is a multi-bit field (e.g., 2-bits), then an explicit bitfield length can also be received via higher layer signaling. This allows the NW to use the reserved bit fields within the paging DCI as TIF and indicate TRS presence/absence information to idle/inactive UEs that detect the paging DCI.

In additional or alternative embodiments, the location or length of TIF can be pre-configured, for example, as part of standardization documentations. In some examples, the location of TIF or the way to find the location of TIF is provided in specifications. For example, one of the reserved bits in DCI format 1-0 associated with P-RNTI or system information radio network temporary identifier ("SI-RNTI") can be assigned to TIF in the specifications. Furthermore, the conditions to enable TIF can be pre-configured. For example, if the idle UE receives configuration information related to TRS occasions, then the UE knows that TIF is included in paging DCI.

In additional or alternative embodiments, the UE may be able to find a length of the bitfield and its interpretation based on pre-configuration or in combination with higher layer signaling. In some examples, the NW may have the option to indicate to the UE the options used for indicating the availability of TRS in TRS occasions. In additional or alternative examples, if the NW mentions both blind detection ("BD") of TRS and L1 signaling as options, then the UE knows, for example, the length of TIF is 2 bits or more. If the NW mentions only L1 signaling, then the UE knows TIF is only one bit. If the NW mentions only BD, then the UE knows either TIF is not transmitted, or it is only one bit. The bit in this example can be used, for example, to let the UE know TRS may or may not be present in the next X ms, otherwise reserved.

In additional or alternative embodiments, the location and length of TIF can be based on a combination of higher layer signaling as well as pre-configuration. For example, the location of TIF or how to determine it is included in the specification, but for the UE to know if TIF is included in paging DCI, then an indicator is included in TRS occasions provisioning information from higher layer signaling which can indicate to the UE if TIF is configured or not. Additionally, the length of TIF can be either provided explicitly as part of higher layer signaling, or the UE can deduce it based on some pre-configured conditions.

In additional or alternative embodiments, the DCI format can be one of a DCI format 1-0 used for paging message (i.e. CRC scrambled with P-RNTI), DCI format 1-0 used for system information messages (i.e. CRC scrambling with SI-RNTI), DCI format used for paging early indication (i.e. with CRC scrambled by RNTI explicitly indicated by higher layers). A paging early indication is an indication that informs a UE whether an upcoming paging occasion contains a paging message (e.g., paging PDSCH) intended for the UE.

In additional or alternative embodiments, the UE can receive via higher layer signaling, a validity timer value that indicates a time duration (e.g., can be units of milliseconds, seconds, paging occasions, frames, SFN cycles, or DRX cycles) for which TRS would be present or would be absent when a corresponding indication is transmitted in the DCI format. In alternative example, the validity timer can be pre-configured as part of specifications (e.g., it can be set to 1.28 sec) or it can be deduced based on a formula. A potential formula can be based on UE identifiers ("IDs"), for example the ID that UE receives from the NW and used by the UE to determine its PO, or based on a function or a fraction of a DRX cycle (e.g., if DRX cycle is 1.28 sec then the validity timer is also 1.28 sec, but if DRX is more than 10 secs, then validity timer is a fraction of DRX cycle, for example, 2.56 sec). In some examples, a combination of higher layer signaling and pre-configuration can be used to deduce the validity timer. For example, the set of potential validity timers can be known to the UE based on pre-configuration and higher layer signaling indicate which of them is used in TIF.

FIG. 2 is a table illustrating an example of a TIF field within a DCI. Other code point definitions (order or subsets) are of course possible. In the example illustrated in FIG. 2, the NW may transmit code 00 when the TRS will be provided for the next Y1 ms, and transmit 10 or 01 when the TRS is soon to be turned off but is present for some remaining time, shorter than Y1 ms. A UE that previously received the 00 indication can continue relying on the presence for the remainder of its validity timer while another UE that receives the 10 or 01 indication acts without a further presence guarantee. The NW may turn off the TRS after Y1 ms have passed from the most recent 00 indication transmission. A UE that previously received a 00 indication can continue relying on the presence for the remainder of its validity timer regardless of any subsequent indication that may indicate contradictory (01) or consistent (10) indication for the duration where the validity timer is running.

FIG. 3 is a table illustrating another example of the TIF field within a DCI. In the example illustrated in FIG. 3, the second code point can be defined to mean one of the following: 1) TRS is not present in TRS occasion(s) in next Y1 ms; 2) TRS may or may not be present in TRS occasion (s) in next Y1 ms. Thus, this code point can be used to inform UE whether it can utilize or not utilize blind detection of TRS.

In some embodiments, a process is provided that includes the UE decoding a DCI including a TIF field. The process further includes the UE determining that the TIF field is set to a first field value that indicates presence of TRS in one or more occasions. The process further includes the UE receiving TRS in one or more of the corresponding occasions and subsequently attempting to decode a paging message in a paging occasion.

Figure 4:
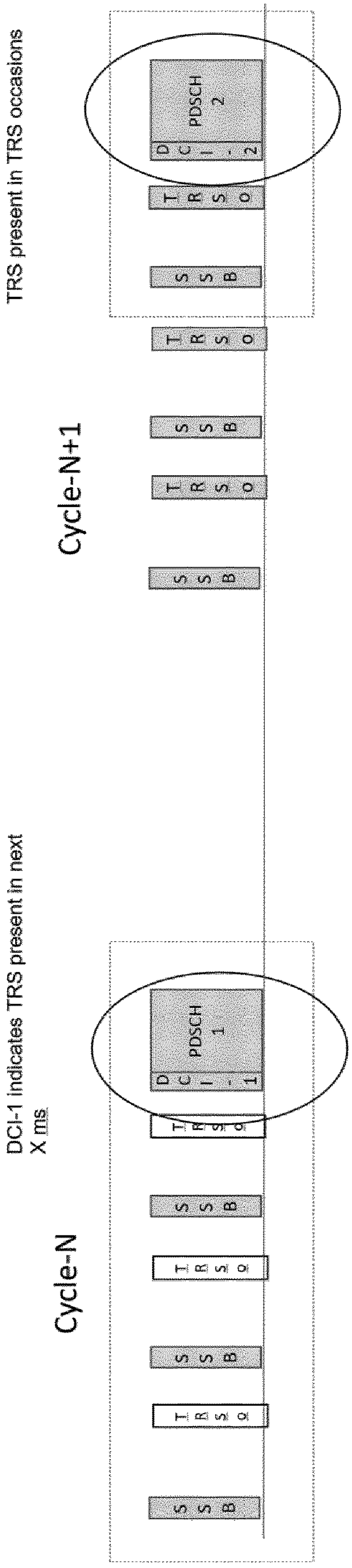
FIG. 4 is a schematic diagram illustrating an example of communication device (e.g., user equipment ("UE")) processing for a paging occasion ("PO") when tracking reference signal ("TRS") presence is indicated in DCI according to some embodiments of inventive concepts.

FIG. 4 illustrates an example of this process in two consecutive paging cycles for a UE. In FIG. 4, an unfilled box (e.g., denoted by TRSo) indicates that the corresponding signal is absent. Shaded portions indicate that the corresponding signal/channel is present. In a preceding cycle, the UE processes three SSBs (shown by dark shaded box) and decodes a paging DCI (DCI-1) and a corresponding PDSCH. In this example, the UE only needs to wake up for 3 SSBs ahead of a PO. The DCI also indicates that TRS is present in next X ms, and the UE based on this information determines that TRS is present in an upcoming PO and processes a subset of SSBs and TRS occasions ahead of upcoming PO, and attempts to decoding paging DCI and a corresponding PDSCH in upcoming PO. The overall UE processing in the upcoming cycle is shown by the dotted box (e.g., the UE only needs to wake up for 1 SSB 1 TRS ahead of a PO).

In some examples, If the UE determines that the TIF field is set to a second field value indicating that TRS may or may not be present in one or more occasions, it can either choose to perform blind detection of TRS in a TRS occasion or omit TRS detection and attempt to detect paging in a paging occasion.

In additional or alternative examples, the UE determines that the TIF field is set to a second field value indicates that ‘TRS may or may not be present in one or more occasions’ or ‘reserved’, and the UE can attempt to blindly detect the presence of TRS in one or more of the corresponding occasions, and if TRS is detected, subsequently attempt to decode a paging message in a paging occasion.

In additional or alternative examples, the UE determines that the TIF field is set to a second field value indicates that TRS may or may not be present in one or more occasions, and the UE can skip blindly detection of TRS presence in one or more of the corresponding occasions, and attempt to decode a paging message in a paging occasion e.g. using legacy receiver preparation procedures not utilizing TRS.

Figure 5:
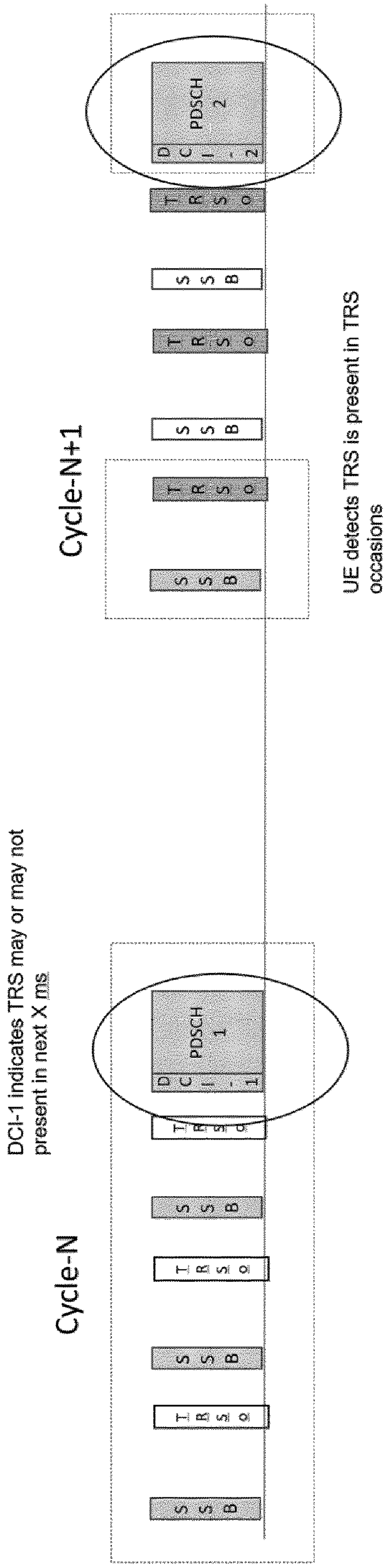
FIG. 5 is a schematic diagram illustrating an example of UE processing for a PO when the DCI indicates that the TRS may be present according to some embodiments of inventive concepts.

FIG. 5 illustrates an example of a UE processing timeline in two consecutive paging cycles for a UE. Similar to FIG. 4, in this figure, an unfilled box (e.g. denoted by TRSo) indicates that the corresponding signal is absent and shaded portion show that the corresponding signal/channel is present. A dotted portion shows the signal may or may not be present. In a preceding cycle, the UE processes three SSBs (shown by dark shaded box) and decodes a paging DCI (DCI-1) and a corresponding PDSCH. In this example, the UE only needs to wake up for 3 SSBs ahead of a PO. The DCI also indicates that TRS may or may not be present in next X ms, and the UE based on this information attempts to blindly detect the presence of TRS ahead of an upcoming PO. If UE detects that TRS is present, it can skip some SSB processing and directly process the paging PDCCH/PDSCH. The overall UE processing in the upcoming cycle is shown by the dotted box (e.g. UE only needs to wake up for 1 SSB and a 1 TRS ahead of a PO, and UE can skip some SSBs and TRS).

In some examples, if the UE determines that the TIF field is set to a third field value indicating that TRS is not present in one or more occasions, it omits TRS detection in the one or more occasions, and attempt to detect paging in a paging occasion e.g. using legacy receiver preparation procedures not utilizing TRS.

Figure 6:
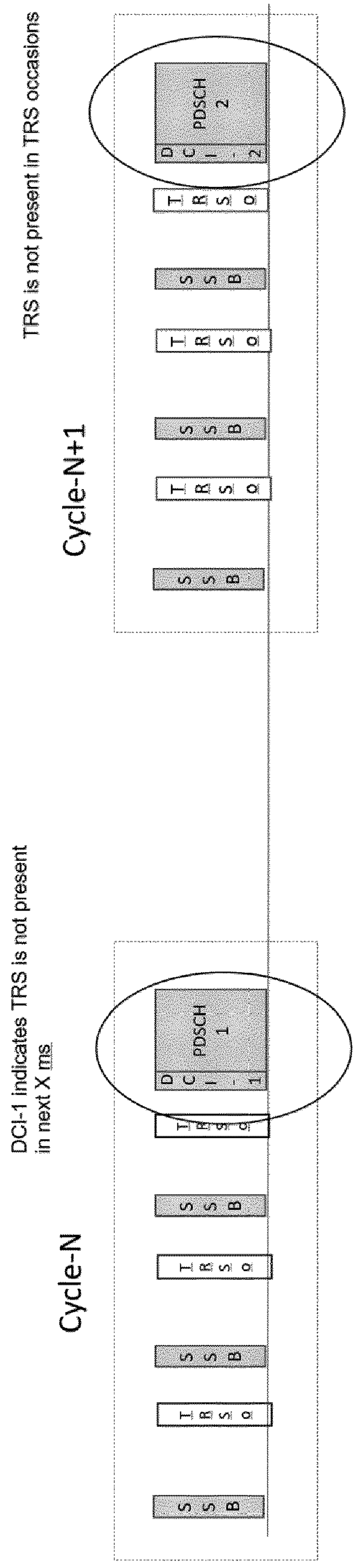
FIG. 6 is a schematic diagram illustrating an example of UE processing for a PO when the DCI indicates that the TRS is not present according to some embodiments of inventive concepts.

FIG. 6 illustrates an example of a UE processing timeline in two consecutive paging cycles for a UE. In this figure, an unfilled box (e.g., denoted by TRSo) indicates that the corresponding signal is absent and shaded portions show that the corresponding signal/channel is present. In a preceding cycle, the UE processes three SSBs (shown by dark shaded box) and decodes a paging DCI (DCI-1) and a corresponding PDSCH. In this example, the UE only needs to wake up for 3 SSBs ahead of a PO. The DCI also indicates that TRS is not present in next X ms, and the UE based on this information knows that no TRS is present ahead of an upcoming PO. The UE processes only SSBs ahead of the upcoming PO and processes the paging PDCCH/PDSCH. The overall UE processing in the upcoming cycle is shown by the dotted box (e.g., UE needs to wake up for 3 SSBs ahead of a PO).

In some embodiments, the signaling enables a NW to efficiently serve UEs that support TRS blind detection as well as UEs that do not support TRS blind detection via a unified signaling framework.

In additional or alternative embodiments, if the TIF is embedded in paging DCI, a situation may arise where no paging DCIs are transmitted in a given PO for a time that exceeds the validity timer duration. In some examples, the NW may cease TRS transmission after the validity period and the UE should not assume the presence of the TRS after the validity timer expires. In additional or alternative examples, the validity timer is automatically extended to until the next paging DCI transmitted in the PO so that the UE may continue using the TRS. To force terminating the TRS validity, the NW may transmit a paging DCI embedding a no-TRS TIF without an associated actual paging message transmission In additional or alternative embodiments, the UE decodes paging DCI but it does not receive TIF (e.g., if TIF is configured only in paging DCIs associated with certain paging occasions), for example if NW has not transmitted TIF, or the UE does not receive a paging DCI. In some examples, if the validity timer from the last indication is still running, then the UE exploits that for its TRS related operations (e.g., the decision to use before paging if present or blindly detect TRS). In additional or alternative examples, when the validity timer is expired and the UE has not received a new TIF, the UE can either assume TRS may or may not be present, that TRS is not present, or it can extend the TIF indication. The latter approach can be based on UE implementation, based the UE can be pre-configured regarding the assumption in this case, based on configuration by the NW through higher layer signaling, or based on the UE knowing what it should assume regarding TRS presence if the validity timer is expired and no new TIF is received.

In additional or alternative embodiments, the UE receives a new TIF while the previous TIF indication validity timer is not expired. In some examples, the UE ignores the previous indication and update it with the new one. In additional or alternative examples, the UE is not expected to receive a new TIF indication as far as the previous TIF indication is still valid, and thus the new indication is considered as error case. The UE behavior in this example can be either pre-configured or explicitly configured by the NW through higher layer signaling.

The reserved fields within a paging DCI (e.g. DCI 1-0) can be used for indication of TRS presence information. For example, there are six reserved bits available in a paging DCI of size 65 bits (including a 24-bit CRC). There are potentially additional reserved bits in the short messages, which can also be utilized from NW perspective. In some examples, the reserved bits may not be sufficient, especially if additional functionality gets added in the paging DCI in the future. Therefore, in some examples, it is preferable to allow a flexibility in NW to use any arbitrary bit within the paging DCI to use for indication of TRS presence.

In some examples, if NW intends to use only field corresponding to the reserved bits, the NW can use an explicit parameter indicating a bit index within the bits corresponding to the reserved bits only. For example, if there are only six reserved bits, the NW needs only a three bit indicator to indicate the position of the bit (within the six reserved bits) used for TRS presence indication.

In additional or alternative examples, if NW intends to use any field within the DCI for TRS presence indication, the NW can use an explicit parameter indicating any bit index within the bits corresponding to the DCI. For example, if there are only 60 bits in the DCI (including 24 CRC bits), the NW needs a six bit indicator to indicate the position of the bit (within the DCI) used for TRS presence indication. Thus, the NW can overload an existing field within paging DCI to also communicate the TRS presence indication.

In additional or alternative examples, the paging DCI includes a TB scaling field which is interpreted as follows, where S denotes a scaling factor used in determination of the transport block size for the corresponding paging PDSCH. The NW can configure the first bit of TB scaling field to also serve as a TIF (e.g., by indicating to the UE that bit number X within the paging DCI (which corresponds to the first bit of TB scaling field) as part of the TRS presence configuration information. Alternatively, the NW may use the reserved index of TB scaling as TIF, for example, if 11 is transmitted for TB scaling, then it indicates that TRS is present in next Yms, but if not, then it may or may not be present. FIG. 8 is a table illustrating an example of a TB scaling field that can be included in a paging DCI.

Figure 7:
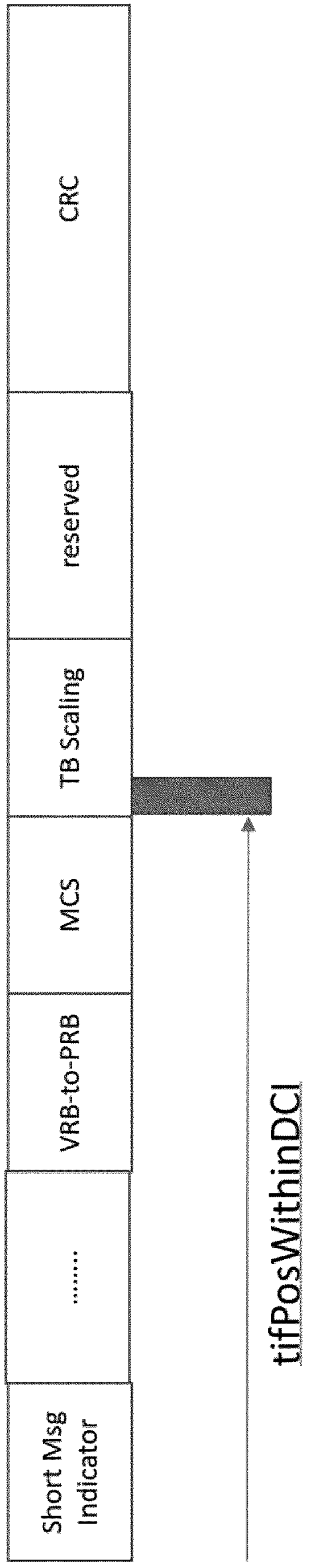
FIG. 7 is a schematic diagram illustrating an example of a flexible bit position indicator of TIF within paging DCI according to some embodiments of inventive concepts.

FIG. 7 illustrates an example DCI format for paging and an explicit tifPosWithinDCI (TIF position within DCI) parameter indicated via higher layers that identifies the position of the TIF within the DCI. The UE can acquire this higher layer parameter, detect a DCI, and use the TIF within the detected DCI to infer the presence of TRS within one or more TRS occasions.

In some embodiments, the examples above can be extended to examples where the position of TIF in paging DCI is pre-configured, for example, can be deduced from standardization documentations.

In additional or alternative embodiments, the NW may embed the TIF in DCI-based PEI transmissions. The TIF format and interpretation of fields may by similar to those described above. The validity timer (e.g. the Y1 ms) may be started from the PEI transmission instance or from the time instance of the PO that the permanent equipment identifier ("PEI") refers to.

In some examples, a UE using the PEI to determine the necessity of PO monitoring may receive the PEI as per regular operation, determine the availability of TRS, and adapt the receiver operation (e.g., selection of signals to be collected for loop convergence) based on whether the TRS is currently available (or has previously been signaled as available and the validity timer has not expired). A UE that does not use PEI for PO monitoring adaptation may receive PEI at the rate of validity timer length, i.e. receiver PEI to re-confirm TRS availability shortly before the previous validity timer has expired. It can then adapt the receiver operation based on whether the TRS is currently available.

In additional or alternative embodiments, the NW can transmit the TIF in a PDCCH transmission separate from paging PDCCH or PEI PDCCH. DCI format 1-0 or other formats may be used, using the same signaling principles as described above.

In additional or alternative embodiments, if the current TIF indicated that TRS is not available, the UE may revert to legacy (non-TRS-assisted) operation but occasionally or periodically recheck the TIF status. If the TIF is embedded in paging DCI, the UE may recheck the TIF status during process of each paging DCI.

In additional or alternative embodiments, the UE may be provided with a PEI configuration, where PEI is based on TRS, i.e., if UE receives a TRS or a specific TRS, e.g., with a specific scrambling code, then it indicates there a paging in one or more of the upcoming POs. In some examples, the TIF indication is not applicable to the specific TRS which is used as PEI, and only to the other ones which are not used as PEI. In additional or alternative embodiments, if TIF indicates TRS is present in the next Yms, then the UE can interpret that TRS is not used as PEI and has to monitor PO.

In additional or alternative embodiments, the TIF indication can be associated with multiple TRS configurations, for example, for TRS associated with multiple beams. In some examples, the UE receives multiple configurations of TRS as potential TRS occasions from higher layer signaling. The TRS configurations are different at least in one parameter, for example, the associated beam. In additional or alternative examples, TIF indication is valid for all the TRS configurations, for example, all the beams within which TRS is transmitted. If TIF indicates that TRS is present in the next Yms, then all the TRSs which their configuration information is provided to the idle UEs are transmitted.

In additional or alternative examples, the TIF indication is only valid for a subset of TRS configurations. For example, the NW can provide through higher layer signaling a subset of TRS configurations which are associated with TIF. For example, the UE may have received configuration information regarding a first TRS, a second TRS and a third TRS. Then the NW as part of TRS provision to the idle UEs indicate that only the first and second TRS are associated with TIF. As such, the UE decodes TIF, and if TIF indicates TRS is present in the next Yms, then the UE knows that the first and second TRS are present, but the third one may or may not be present. The indication that which TRSs are associated with TIF can be indicated e.g., through an indicator as part of the provision of TRS configuration information to the idle UEs, e.g., the parameter can be called tifassociated(enable,disable), where if it is enabled, it means TIF is associated with this specific TRS, and if disabled, then it means TIF is not associated with this TRS. Such a division is useful also for the case that one or more TRSs are also used as PEI, and thus the NW has the ability to exclude them from association with TIF.

In additional or alternative examples, the NW can configure the TRS resources in different groups, e.g., the first group includes the first and second TRS resources and the second group includes the third TRS resource. The NW can the additionally configure TIF such that as part of the indication, the UE receives indication that which of the groups of TRS resources are indicated. E.g., TIF may include 3 bits. Example below depicts how such bits can be used in order to convey TIF indication for two groups. The same principle can be used to extend to more than two groups.

In additional or alternative examples, in case one or more group of TRS resources are not associated with TIF, then the UE knows that they may or may not be present, and thus if it wants to use them, then it has to apply blind detection. In this example, the first TIF bit is used as indication to which group is associated, i.e., a bit 0 indicates the first group and a bit 1 indicates the second group. FIG. 9 is a table illustrating an example of a TIF field in a DCI that includes a bit indicating which group is associated. In this example, fields 011 and 111 are reserved. In one example one, e.g., 011 can be used also to indicate that e.g., TRS is present in TRS occasion(s) of the first and second group in next Y1 and Y2 ms, respectively, and the other one, e.g., 111 can be used to indicate e.g., TRS may or may not be present in TRS occasion(s) of the first and second group in next Y1 and Y2 ms, respectively.

In additional or alternative examples, reserved bits in paging DCI or other bits can be used for TIF. In one example, the TIF bitfield may also not be continuous, e.g., the location of the first, the second or the third bit in FIG. 9 may be in different parts of paging DCI and not continuous. In this case, either the locations is pre-configured, or the NW can flexibility configure the location of each explicit bit. In additional or alternative examples, the bit orders follow the location number of each bit. For example, the first bit may be in location, 10, the second in 15, and the third in 21.

In some embodiments, to allow flexible use of the reserved bits in a DCI, a header field can be configured. A subset of the reserved bits can serve as a header field, the header field indicating to the UE how to interpret some/all of the other reserved bits. For example, when header field indicates a pre-determined value (e.g., first value such as 01), the next X reserved bits (e.g., 2 reserved bits) in the DCI can indicate TRS presence/absence for a next time window (in units of slots, millisecond, seconds, or SFNs).

In some examples, when a header field indicates a pre-determined value (e.g., second value such as 10), the next Y reserved bits (e.g., 2 reserved bits) in the DCI can inform about PEI for some/all paging groups.

In additional or alternative examples, when a header field indicates a pre-determined value (e.g., third value such as 11), the next Z reserved bits (3 reserved bits) in the DCI can indicate the minimum TB scaling value assumption for reception of paging PDSCH in a next time window (in units of slots, milliseconds, seconds, or SFNs).

In additional or alternative examples, when a header field indicates a pre-determined value (e.g. third value such as 11), the remaining reserved bits can be treated as reserved.

Although some embodiments herein are described using TRS and TRS occasions, the same principles are applicable for TRS/CSI-RS and TRS/CSI-RS occasions.

Some embodiments described herein allow idle mode UE power savings by allowing a NW to flexibly indicate via L1 signaling whether TRS is 'present' and 'may or may not be present' in one or more TRS occasions. In additional or alternative embodiments, the NW can indicate whether TRS is absent in one or more TRS occasions. This signaling can enable a flexible UE implementation that can skip TRS detection or take advantage of TRS blind detection and save UE power.

Figure 13:
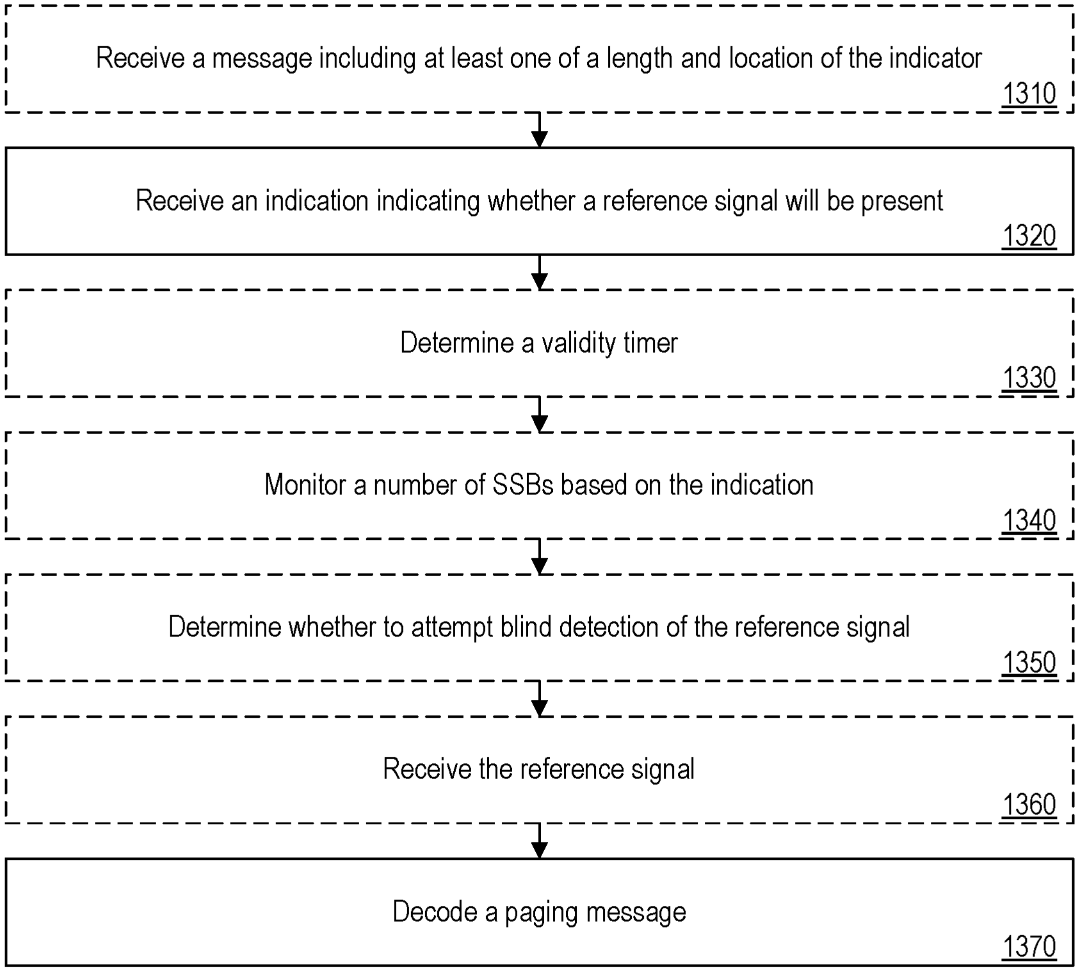
FIG. 13 is a flow chart illustrating examples of operations of a UE according to some embodiments of inventive concepts.

Operations of a communication device (implemented using the structure of the block diagram of FIG. 10 will now be discussed with reference to the flow chart of FIG. 13 according to some embodiments of inventive concepts. For example, modules may be stored in memory 1005 of FIG. 10, and these modules may provide instructions so that when the instructions of a module are executed by respective communication device processing circuitry 1003, processing circuitry 1003 performs respective operations of the flow chart.

At block 1310, processing circuitry 1003 receives, via transceiver 1001, a message including at least one of a length and location of an indicator.

At block 1320, processing circuitry 1003 receives, via transceiver 1001, the indication indicating whether a reference signal will be present during a subsequent reference signal occasion. In some embodiments, the indication is received while the communication device is awake during a DRX cycle as part of being in an idle state. In additional or alternative embodiments, the reference signal is a tracking reference signal, TRS, or a channel state information reference signal, CSI-RS.

In additional or alternative embodiments, receiving the indication includes receiving the indication indicating one of the following: that the reference signal will be present at the reference signal occasion; that the reference signal may or may not be present at the reference signal occasion; and that the reference signal will be absent at the reference signal occasion. In additional or alternative embodiments, receiving the indication includes receiving the indication indicating that the reference signal will be present at the reference signal occasion.

In additional or alternative embodiments, receiving the indication includes receiving downlink control information, DCI, including the indication during a first DRX cycle, the indication indicating whether the reference signal will be transmit by the network node at the reference signal occasion during a second DRX cycle. In additional or alternative embodiments, the DCI is a DCI format 1_0 with cyclic redundancy check, CRC, scrambled by at least one of the following radio network temporary identifier, RNTIs: paging RNTI, P-RNTI, and system information, SI-RNTI.

In additional or alternative embodiments, receiving the indication includes receiving a synchronization signal block, SSB, including the indication during a first DRX cycle, the indication indicating whether the reference signal will be transmit by the network node at the reference signal occasion during the first DRX cycle.

At block 1330, processing circuitry 1003 determines a validity timer that indicates a time duration for which the reference signal will be present at reference signal occasions. In some embodiments, determining the validity timer includes receiving an indication of the validity timer from the network node. In additional or alternative embodiments, determining the validity timer includes determining the validity timer based on an identifier of the communication device.

At block 1340, processing circuitry 1003 monitors a number of SSBs based on the indication. In some embodiments, monitoring the number of SSBs transmitted by the network node includes responsive to receiving the indication indicating that the reference signal will be present, monitoring only one SSB transmitted by the network node. In additional or alternative embodiments, responsive to attempting to detect the reference signal at the reference signal occasion, determining the number of SSBs to be monitored based on whether the reference signal was received.

At block 1350, processing circuitry 1003 determines whether to attempt blind detection of the reference signal. In some embodiments, the communication device only determines whether to attempt blind detection if the indication indicated that the reference signal may or may not be present at the reference signal occasion.

At block 1360, processing circuitry 1003 receives, via transceiver 1001, the reference signal at the reference signal occasion.

At block 1370, processing circuitry 1003 decodes a paging message at a paging occasion following the reference signal occasion. In some embodiments, the paging message is decoded using monitored SSBs. In additional or alternative embodiments, decoding the paging message includes responsive to receiving the reference signal at the reference signal occasion, decoding the paging message based on the reference signal Various operations from the flow chart of FIG. 13 may be optional with respect to some embodiments of communication devices and related methods. For example, in regards to the specific Example 1, below, blocks 1310 and 1330-1360 of FIG. 13 are optional.

Figure 14:
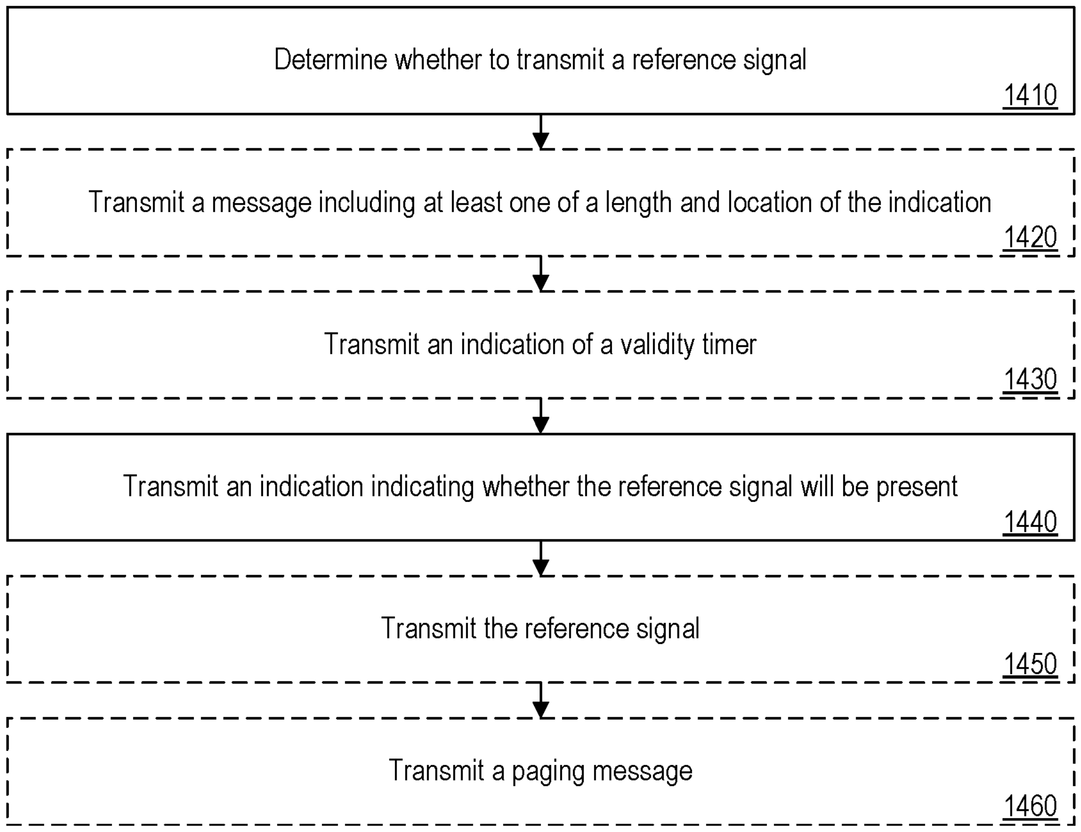
FIG. 14 is a flow chart illustrating examples of operations of a network node according to some embodiments of inventive concepts.

Operations of a network node (implemented using the structure of the block diagram of FIG. 11 will now be discussed with reference to the flow chart of FIG. 14 according to some embodiments of inventive concepts. For example, modules may be stored in memory 1105 of FIG. 11, and these modules may provide instructions so that when the instructions of a module are executed by respective RAN node processing circuitry 1103, processing circuitry 1103 performs respective operations of the flow chart. Although the operations of FIG. 14 are described below as being performed by a RAN node, the operations can be performed by any suitable network node (e.g., CN node 1200).

At block 1410, processing circuitry 1203 determines whether to transmit a reference signal at a reference signal occasion. In some embodiments, the reference signal is a tracking reference signal, TRS, or a channel state information reference signal, CSI-RS. In additional or alternative embodiments, the communication device is a first communication device in an idle state, and determining whether to transmit the reference signal at the reference signal occasion includes determining whether a second communication device is in an active state.

At block 1420, processing circuitry 1203 transmits, via transceiver 1201, a message including at least one of a length and a location of the indication.

At block 1430, processing circuitry 1203 transmits, via transceiver 1201, an indication of a validity timer that indicates a time duration for which the reference signal will be present at reference signal occasions.

At block 1440, processing circuitry 1203 transmits, via transceiver 1201, an indication indicating whether the reference signal will be transmit at the reference signal. In some embodiments, transmitting the indication includes transmitting the indication indicating one of the following: that the reference signal will be present at the reference signal occasion; that the reference signal may or may not be present at the reference signal occasion; and that the reference signal will be absent at the reference signal occasion. In additional or alternative embodiments, transmitting the indication includes transmitting the indication indicating that the reference signal will be present at the reference signal occasion.

In additional or alternative embodiments, transmitting the indication includes transmitting downlink control information, DCI, including the indication during a first DRX cycle of the communication device, the indication indicating whether the reference signal will be transmit by the network node at the reference signal occasion during a second DRX cycle. In additional or alternative embodiments, DCI is a DCI format 1_0 with cyclic redundancy check, CRC, scrambled by at least one of the following radio network temporary identifier, RNTIs: paging RNTI, P-RNTI, and system information, SI-RNTI.

In additional or alternative embodiments, transmitting the indication includes transmitting a synchronization signal block, SSB, including the indication during a first DRX cycle, the indication indicating whether the reference signal will be transmit by the network node at the reference signal occasion during the first DRX cycle.

At block 1450, processing circuitry 1203 transmits, via transceiver 1201, the reference signal at the reference signal occasion.

At block 1460, processing circuitry 1203 transmits, via transceiver 1201, a paging message.

Various operations from the flow chart of FIG. 6 may be optional with respect to some embodiments of communication devices and related methods. For example, with regards to specific Example 16, below, blocks 1420-1430 and 1450-1460 of FIG. 14 are optional.

Specific Example are outlined below.

Example 1. A method of operating a communication device in a communications network, the method comprising receiving (1320) an indication from a network node in the communication network indicating one of the following: that a reference signal will be present at a reference signal occasion, that a reference signal may or may not be present at a reference signal occasion, or that the reference signal will be absent at the reference signal occasion; and decoding (1370) a paging message at a paging occasion following the reference signal occasion.

Example 2. The method of Example 1, wherein decoding the paging message at the paging occasion comprises decoding the paging message at the paging occasion using the reference signal indicated by the indication.

Example 3. The method of any of Examples 1-2, wherein the reference signal is a tracking reference signal, TRS, or a channel state information reference signal, CSI-RS.

Example 4. The method of any of Examples 1-3, further comprising monitoring (1340) a number of synchronization signal blocks, SSBs, transmitted by the network node prior to the paging occasion, the number of SSBs monitored being based on the indication, wherein decoding the paging message at the paging occasion comprises decoding the paging message at the paging occasion using the SSBs that were monitored.

Example 5. The method of Example 4, wherein monitoring the number of SSBs transmitted by the network node comprises responsive to receiving the indication indicating that the reference signal will be present, monitoring only one SSB transmitted by the network node.

Example 6. The method of Example 4, wherein determining whether to attempt to blind detection comprises determining to attempt the blind detection, and wherein monitoring the number of SSBs comprises, responsive to attempting to detect the reference signal at the reference signal occasion, determining the number of SSBs to be monitored based on whether the reference signal was received.

Example 7. The method of any of Examples 1-4, wherein receiving the indication comprises receiving the indication indicating that the reference signal will be present at the reference signal occasion, the method further comprising responsive to receiving the indication indicating that the reference signal will be present at the reference signal occasion, receiving (1360) the reference signal at the reference signal occasion.

Example 8. The method of any of Examples 1-4, wherein receiving the indication comprises receiving the indication indicating that the reference signal may or may not be present at the reference signal occasion, the method further comprising: responsive to receiving the indication indicating that the reference signal may or may not be present at the reference signal occasion, determining (1350) whether to attempt blind detection of the reference signal at the reference signal occasion.

Example 9. The method of any of Examples 1-8, wherein receiving the indication comprises receiving downlink control information, DCI, including the indication during a first DRX cycle, the indication indicating whether the reference signal will be transmitted by the network node at the reference signal occasion during a second DRX cycle.

Example 10. The method of Example 9, wherein the DCI is a DCI format 1_0 with cyclic redundancy check, CRC, scrambled by at least one of the following radio network temporary identifier, RNTIs: paging RNTI, P-RNTI, and system information, SI-RNTI.

Example 11. The method of any of Examples 9-10, further comprising: receiving (1310) a message including at least one of a length and location of the indication in the DCI.

Example 12. The method of any of Examples 1-9, wherein receiving the indication comprises receiving a synchronization signal block, SSB, including the indication during a first DRX cycle, the indication indicating whether the reference signal will be transmitted by the network node at the reference signal occasion during the first DRX cycle.

Example 13. The method of any of Examples 1-12, further comprising: determining (1330) a validity timer that indicates a time duration for which the reference signal will be present at reference signal occasions.

Example 14. The method of Examples 13, wherein determining the validity timer comprises receiving an indication of the validity timer from the network node.

Example 15. The method of Examples 13, wherein determining the validity timer comprises determining the validity timer based on an identifier of the communication device.

Example 16. A method of operating a network node in a communications network, the method comprising determining (1410) whether to transmit a reference signal at a reference signal occasion; and transmitting (1440) an indication to a communication device in the communication network, the indication indicating whether the reference signal will be transmitted at the reference signal occasion.

Example 17. The method of Example 16, wherein the reference signal is a tracking reference signal, TRS, or a channel state information reference signal, CSI-RS.

Example 18. The method of any of Examples 16-17, wherein transmitting the indication comprises transmitting the indication indicating one of the following: that the reference signal will be present at the reference signal occasion; that the reference signal may or may not be present at the reference signal occasion; and that the reference signal will be absent at the reference signal occasion.

Example 19. The method of Example 18, wherein transmitting the indication comprises transmitting the indication indicating that the reference signal will be present at the reference signal occasion, the method further comprising: responsive to transmitting the indication indicating that the reference signal will be present at the reference signal occasion, transmitting (1450) the reference signal at the reference signal occasion.

Example 20. The method of any of Examples 16-19, further comprising: responsive to transmitting the indication, transmitting (1460) a paging message.

Example 21. The method of any of Examples 16-20, wherein transmitting the indication comprises transmitting downlink control information, DCI, including the indication during a first DRX cycle of the communication device, the indication indicating whether the reference signal will be transmit by the network node at the reference signal occasion during a second DRX cycle.

Example 22. The method of Example 21, wherein the DCI is a DCI format 1_0 with cyclic redundancy check, CRC, scrambled by at least one of the following radio network temporary identifier, RNTIs: paging RNTI, P-RNTI, and system information, SI-RNTI.

Example 23. The method of any of Examples 21-22, further comprising: transmitting (1420) a message including at least one of a length and location of the indication in the DCI.

Example 24. The method of any of Examples 16-20, wherein transmitting the indication comprises transmitting a synchronization signal block, SSB, including the indication during a first DRX cycle, the indication indicating whether the reference signal will be transmitted by the network node at the reference signal occasion during the first DRX cycle.

Example 25. The method of any of Examples 16-24, further comprising: transmitting (1430) an indication of a validity timer that indicates a time duration for which the reference signal will be present at reference signal occasions.

Example 26. The method of any of Examples 16-25, wherein the communication device is a first communication device in an idle state, and wherein determining whether to transmit the reference signal at the reference signal occasion, comprises determining whether a second communication device is in an active state.

Example 27. A communication device (1000) in a communications network, the communication device comprising: processing circuitry (1003); and memory (1005) coupled to the processing circuitry and having instructions stored therein that are executable by the processing circuitry to cause the communication device to perform operations comprising any of the operations of Examples 1-15.

Example 28. A communication device (1000) in a communications network, the communication device adapted to perform any of the operations of Examples 1-15.

Example 29. A computer program comprising program code to be executed by processing circuitry (1003) of a communication device (1000) in a communications network, whereby execution of the program code causes the communication device to perform operations comprising any of the operations of Examples 1-15.

Example 30. A computer program product comprising a non-transitory storage medium including program code to be executed by processing circuitry (1003) of a communication device (1000) in a communications network, whereby execution of the program code causes the communication device to perform operations comprising any of the operations of Examples 1-15.

Example 31. A network node (1100, 1200) in a communications network, the network node comprising: processing circuitry (1103, 1203); and memory (1105, 1205) coupled to the processing circuitry and having instructions stored therein that are executable by the processing circuitry to cause the network node to perform operations comprising any of the operations of Examples 16-26.

Example 32. A network node (1100, 1200) in a communications network, the network node adapted to perform any of the operations of Examples 16-26.

Example 33. A computer program comprising program code to be executed by processing circuitry (1103, 1203) of a network node (1100, 1200) in a communications network, whereby execution of the program code causes the communication device to perform operations comprising any of the operations of Examples 16-26.

Example 34. A computer program product comprising a non-transitory storage medium including program code to be executed by processing circuitry (1103, 1203) of a network node (1100, 1200) in a communications network, whereby execution of the program code causes the network node to perform operations comprising any of the operations of Examples 16-26.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 15:
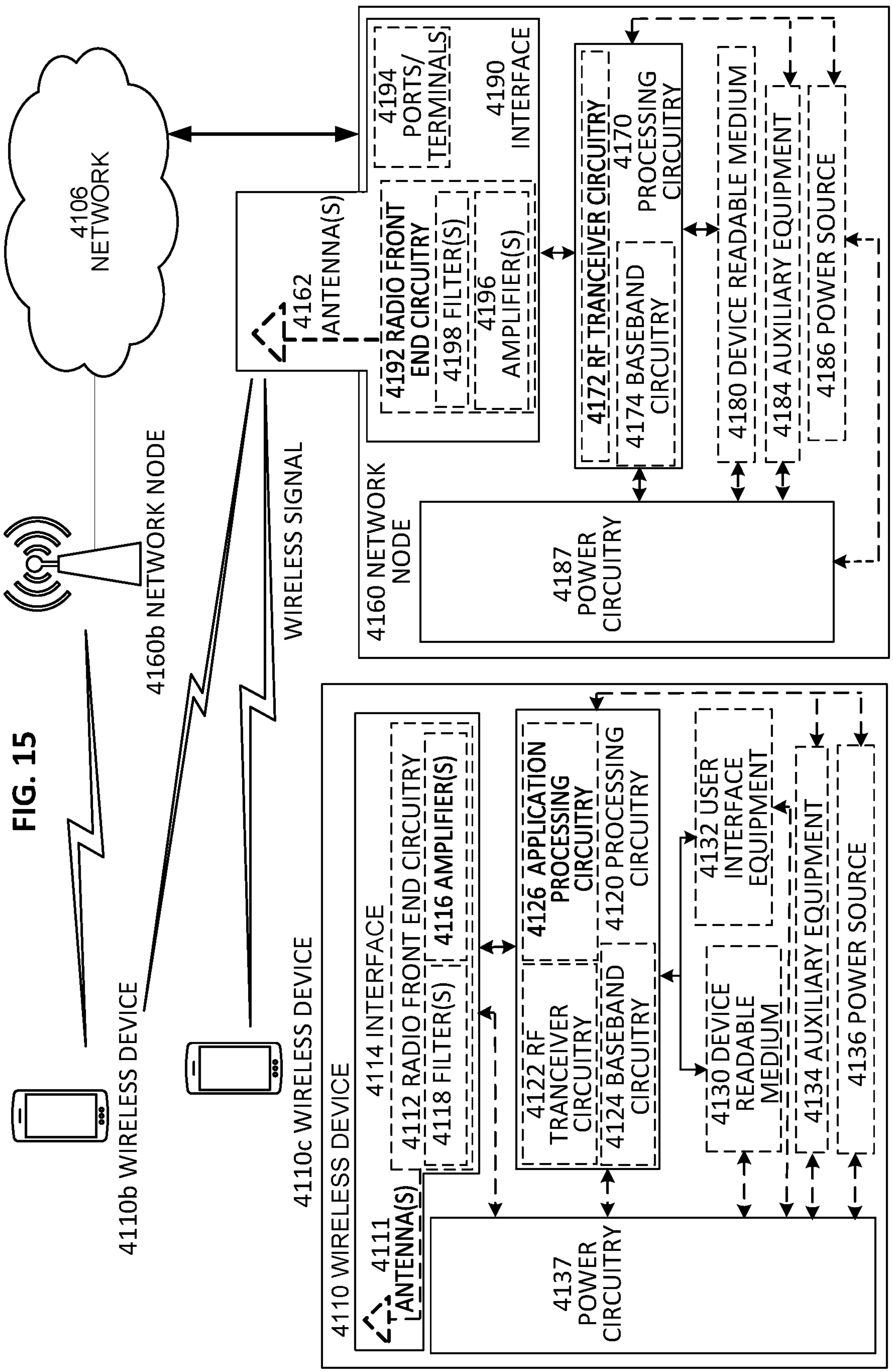
FIG. 15 is a block diagram of a wireless network in accordance with some embodiments.

FIG. 15 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 4106, network nodes 4160 and 4160*b*, and wireless devices 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and wireless device 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or wireless devices 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or wireless devices via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 15 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X)

and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. wireless device 4110 may include multiple sets of one or more of the illustrated components for different wireless technologies supported by wireless device 4110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 4110.

Antenna 4111 may include one or more antennas or antenna arrays, configured to send and/or receive wireless signals, and is connected to interface 4114. In certain alternative embodiments, antenna 4111 may be separate from wireless device 4110 and be connectable to wireless device 4110 through an interface or port. Antenna 4111, interface 4114, and/or processing circuitry 4120 may be configured to perform any receiving or transmitting operations described herein as being performed by a wireless device. Any information, data and/or signals may be received from a network node and/or another wireless device. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, wireless device 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or wireless devices via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 4110 components, such as device readable medium 4130, wireless device 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of wireless device 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a wireless device may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of wireless device 4110, but are enjoyed by wireless device 4110 as a whole, and/or by end users and the wireless network generally.

Processing circuitry 4120 may be configured to perform any determining, calculating, or similar operations (e.g., certain obtaining operations) described herein as being performed by a wireless device. These operations, as performed by processing circuitry 4120, may include processing information obtained by processing circuitry 4120 by, for example, converting the obtained information into other information, comparing the obtained information or converted information to information stored by wireless device 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with wireless device 4110. Such interaction may be of many forms, such as visual, audial, tactile, etc. User interface equipment 4132 may be operable to produce output to the user and to allow the user to provide input to wireless device 4110. The type of interaction may vary depending on the type of user interface equipment 4132 installed in wireless device 4110. For example, if wireless device 4110 is a smart phone, the interaction may be via a touch screen; if wireless device 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into wireless device 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from wireless device 4110, and to allow processing circuitry 4120 to output information from wireless device 4110. User interface equipment 4132 may include, for example, a speaker, a display, vibrating circuitry, a USB port, a headphone interface, or other output circuitry. Using one or more input and output interfaces, devices, and circuits, of user interface equipment 4132, wireless device 4110 may communicate with end users and/or the wireless network, and allow them to benefit from the functionality described herein.

Auxiliary equipment 4134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. wireless device 4110 may further comprise power circuitry 4137 for delivering power from power source 4136 to the various parts of wireless device 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case wireless device 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of wireless device 4110 to which power is supplied.

Figure 16:
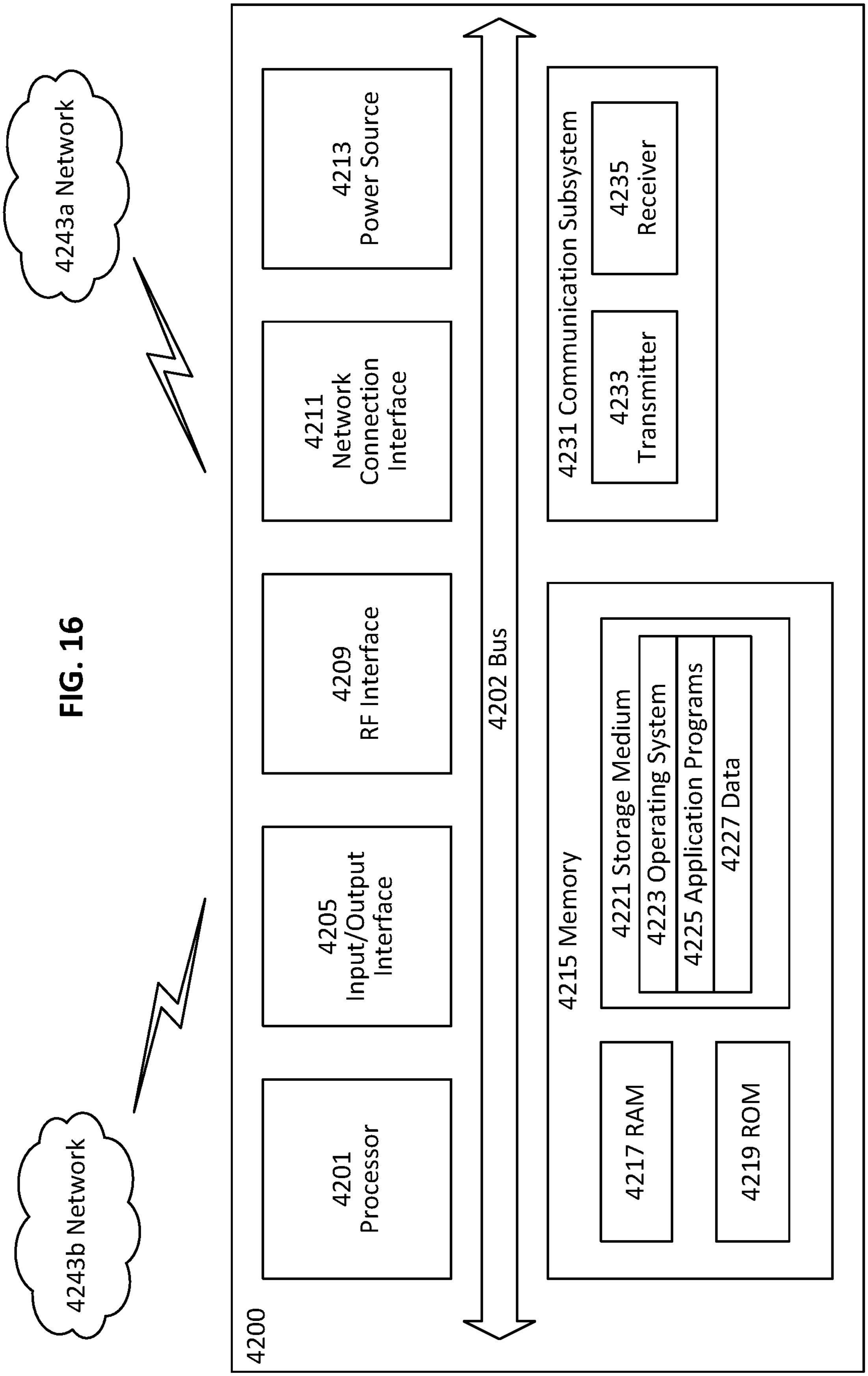
FIG. 16 is a block diagram of a user equipment in accordance with some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 4200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 16, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 16 is a UE, the components discussed herein are equally applicable to a wireless device, and vice-versa.

In FIG. 16, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 16, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 17:
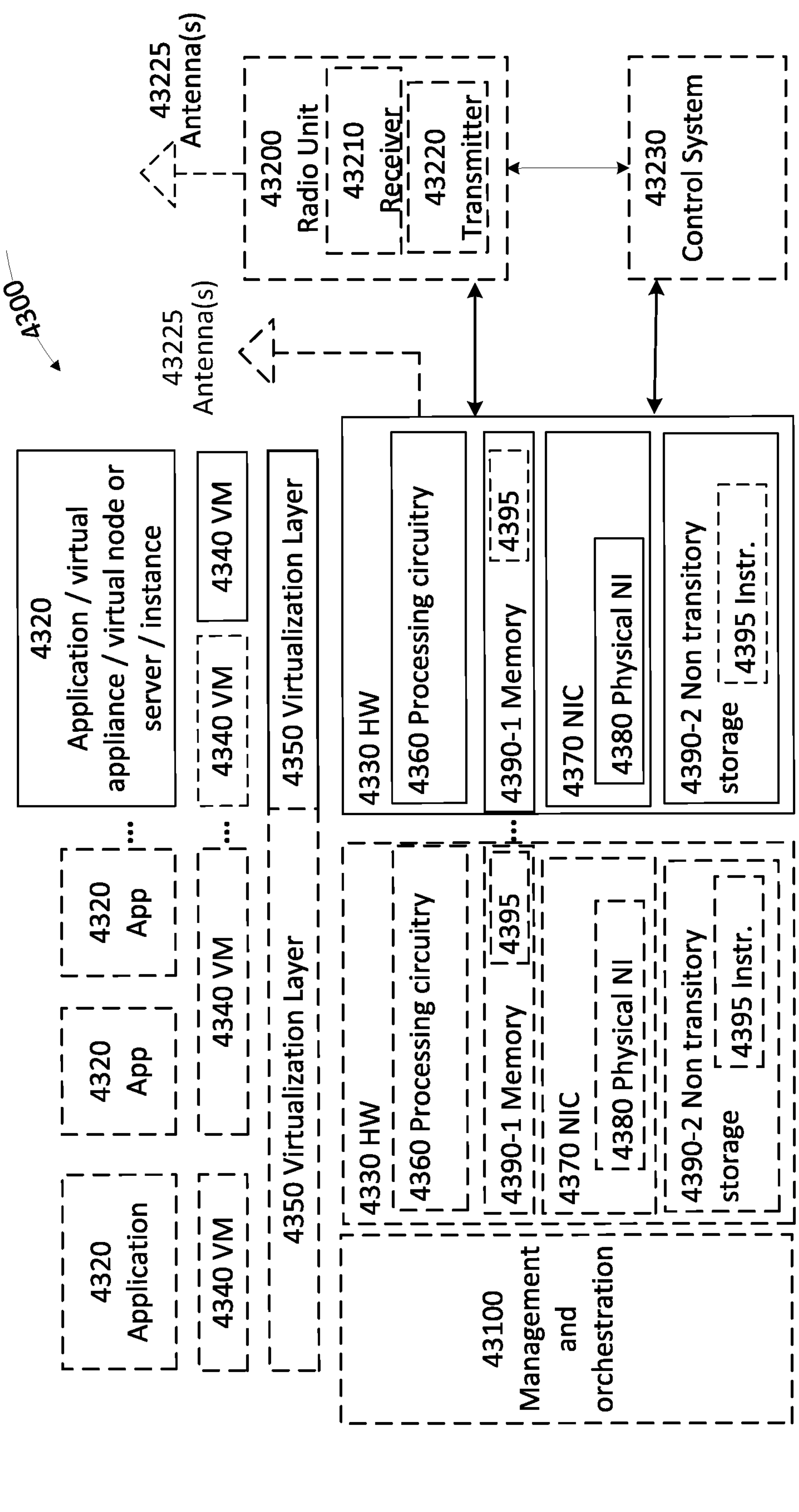
FIG. 17 is a block diagram of a virtualization environment in accordance with some embodiments.

FIG. 17 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 17, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 17.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 18:
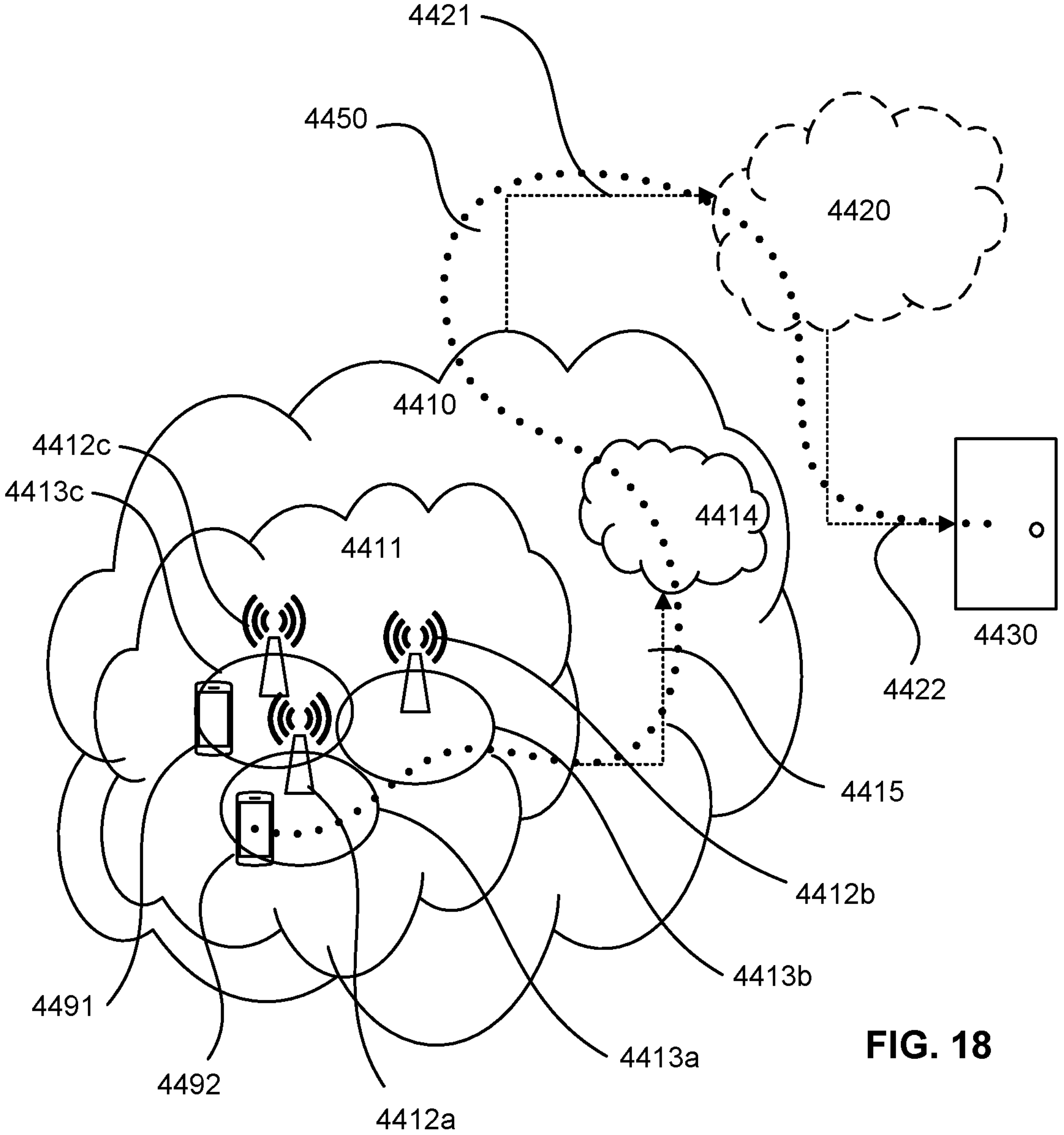
FIG. 18 is a block diagram of a telecommunication network connected via an intermediate network to a host computer in accordance with some embodiments.

FIG. 18 illustrates a telecommunication network connected via an intermediate network to a host computer in accordance with some embodiments.

With reference to FIG. 18, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 18 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device in a communications network, the method comprising:

receiving a configuration for potential tracking reference signal occasions in a system information signal;

receiving an indication from a network node in the communication network indicating whether a tracking reference signal (TRS) will be present at the configured reference signal occasions; and receiving a second indication of a validity timer from the network node, wherein the validity timer indicates a time duration for which the TRS will be present at the configured reference signal occasions when the indication indicates that the TRS will be present at the configured reference signal occasions.

2. The method of claim 1, further comprising decoding a paging message at a paging occasion following the reference signal occasion using the TRS indicated by the indication.

3. The method of claim 1, further comprising:

monitoring system information, wherein the system information comprises configuration information related to TRS occasions and/or potential TRS occasions.

4. The method of claim 1, wherein receiving the indication comprises receiving at least one parameter indicating a location of a TRS presence/absence indicator field (TIF) within a downlink control information (DCI) format.

5. The method of claim 1, wherein receiving the indication comprises receiving the indication indicating that the reference signal will be present at the reference signal occasion, the method further comprising:

responsive to receiving the indication indicating that the reference signal will be present at the reference signal occasion, receiving the reference signal at the reference signal occasion.

6. The method of claim 1, wherein receiving the indication comprises receiving the indication indicating that the reference signal may or may not be present at the reference signal occasion, the method further comprising:

responsive to receiving the indication indicating that the reference signal may or may not be present at the reference signal occasion, determining whether to attempt blind detection of the reference signal at the reference signal occasion.

7. A method of operating a network node in a communications network, the method comprising:

transmitting a configuration for potential tracking reference signal occasions in a system information signal;

determining whether to transmit a tracking reference signal (TRS) at the configured reference signal occasions;

transmitting an indication to a communication device in the communication network, the indication indicating whether the TRS will be present at the configured reference signal occasions; and transmitting a second indication of a validity timer, wherein the validity timer indicates a time duration for which the TRS will be present at the configured reference signal occasions when the indication indicates that the TRS will be present at the configured reference signal occasions.

8. The method of claim 7, wherein transmitting the indication comprises transmitting the indication indicating that the reference signal will be present at the reference signal occasion, the method further comprising:

responsive to transmitting the indication indicating that the reference signal will be present at the reference signal occasion, transmitting the reference signal at the reference signal occasion.

9. The method of claim 7, further comprising:

subsequent to transmitting the indication, transmitting a paging message.

10. The method of claim 7, wherein transmitting the indication comprises transmitting downlink control information (DCI) including the indication, the DCI being one of: a paging DCI; and a paging early indication DCI, the method further comprising:

transmitting a message including at least one of a length and location of the indication in the DCI.

11. The method of claim 7, further comprising:

transmitting system information, wherein the system information comprises configuration information related to TRS occasions and/or potential TRS occasions.

12. The method of claim 7, wherein transmitting the indication comprises transmitting at least one parameter indicating a location of a TRS presence/absence indicator field (TIF) within a downlink control information (DCI) format.

13. A communication device in a communications network, the communication device comprising:

processing circuitry; and memory coupled to the processing circuitry and having instructions stored therein that are executable by the processing circuitry to cause the communication device to perform operations to:

receive a configuration for potential tracking reference signal occasions in a system information signal;

receive an indication from a network node in the communication network indicating whether a tracking reference signal (TRS) will be present at the configured reference signal occasions; and receive a second indication of a validity timer from the network node, wherein the validity timer indicates a time duration for which the TRS will be present at the configured reference signal occasions when the indication indicates that the TRS will be present at the configured reference signal occasions.

14. A network node in a communications network, the network node comprising:

processing circuitry; and memory coupled to the processing circuitry and having instructions stored therein that are executable by the processing circuitry to cause the network node to perform operations to:

transmit a configuration for potential tracking reference signal occasions in a system information signal;

determine whether to transmit a tracking reference signal (TRS) at a reference signal occasion;

transmit an indication to a communication device in the communication network, the indication indicating whether the TRS will be present at the configured reference signal occasions; and transmit a second indication of a validity timer, wherein the validity timer indicates a time duration for which the TRS will be present at the configured reference signal occasions when the indication indicates that the TRS will be present at the configured reference signal occasions.

15. A computer program product comprising a non-transitory computer readable medium storing program code to be executed by processing circuitry to perform operations comprising the operations of claim 1.

16. A computer program product comprising a non-transitory computer readable medium storing program code to be executed by processing circuitry to perform operations comprising the operations of claim 7.

* * * * *